(12) United States Patent
Kubo

(10) Patent No.: US 12,397,356 B2
(45) Date of Patent: Aug. 26, 2025

(54) CUTTING TOOL

(71) Applicant: Sumitomo Electric Hardmetal Corp., Itami (JP)

(72) Inventor: Ryota Kubo, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 17/913,859

(22) PCT Filed: Jan. 26, 2022

(86) PCT No.: PCT/JP2022/002921
§ 371 (c)(1),
(2) Date: Sep. 23, 2022

(87) PCT Pub. No.: WO2023/144937
PCT Pub. Date: Aug. 3, 2023

(65) Prior Publication Data
US 2024/0207946 A1 Jun. 27, 2024

(51) Int. Cl.
*B23B 27/16* (2006.01)
*B23C 5/24* (2006.01)

(52) U.S. Cl.
CPC ........ *B23B 27/1611* (2013.01); *B23C 5/2462* (2013.01); *B23C 5/2472* (2013.01)

(58) Field of Classification Search
CPC ....... B23C 5/2462; B23C 5/2472; B23C 5/24; B23C 5/06; B23C 5/2226; B23C 5/2479; B23C 5/2489; B23B 27/1611
See application file for complete search history.

(56) References Cited

U.S. PATENT DOCUMENTS 3,363,299 A * 1/1968 Gowanlock ............... B23C 5/24
407/41
3,535,759 A * 10/1970 Mueller ............... B23C 5/2269
407/41
(Continued)

FOREIGN PATENT DOCUMENTS

DE 2140004 A 2/1973
DE 2806079 B1 3/1979
(Continued)

OTHER PUBLICATIONS

International Search Report and Written Opinion mailed on Apr. 5, 2022, received for PCT Application PCT/JP2022/002921, filed on Jan. 26, 2022, 15 pages including English Translation.

*Primary Examiner* — Sara Addisu
(74) *Attorney, Agent, or Firm* — XSENSUS LLP

(57) ABSTRACT

A cutting tool is rotatable about a central axis and has a front end in an axial direction along the central axis. The cutting tool includes a body, a blade, a first attachment screw, an adjustment piece, and a second attachment screw. The body has an outer peripheral surface. A pocket is formed in the outer peripheral surface at an end portion on the front end side. The blade is attached to the body by screwing the first attachment screw into the body in the pocket. The blade has a blade side surface facing inward in a radial direction that is orthogonal to the axial direction and that passes through the central axis. An inner wall surface of the pocket has a contact surface facing the blade side surface with a space being interposed between the blade side surface and the contact surface in the radial direction.

3 Claims, 16 Drawing Sheets

(56) References Cited

U.S. PATENT DOCUMENTS

| | | | | |
|---|---|---|---|---|
| 3,708,843 A * | 1/1973 | Erkfritz | B23C 5/2208 407/41 |
| 3,792,517 A * | 2/1974 | Gage | B23C 5/2462 407/41 |
| 3,847,555 A * | 11/1974 | Pegler | B23C 5/24 407/46 |
| 4,329,091 A * | 5/1982 | Erkfritz | B23C 5/2269 407/111 |
| 4,592,680 A * | 6/1986 | Lindsay | B23C 5/24 407/41 |
| 4,611,959 A * | 9/1986 | Kress | B23D 77/048 408/239 R |
| 4,627,771 A * | 12/1986 | Kieninger | B23C 5/2226 407/41 |
| 4,692,069 A * | 9/1987 | Kieninger | B23C 5/2226 82/902 |
| 5,120,166 A * | 6/1992 | Woerner | B23D 37/005 407/44 |
| 5,853,271 A * | 12/1998 | Schanz | B23D 77/006 407/92 |
| 5,863,156 A * | 1/1999 | Satran | B23C 5/2208 407/45 |
| 6,056,484 A * | 5/2000 | Mitchell | B23C 5/2493 407/41 |
| 6,497,537 B1 * | 12/2002 | Francis | B23C 5/2208 407/46 |
| 6,511,264 B2 * | 1/2003 | Ripley | B23C 5/2493 407/43 |
| 6,640,853 B1 * | 11/2003 | Sun | B23C 5/24 241/294 |
| 7,037,050 B1 * | 5/2006 | Maier | B23C 5/2479 407/35 |
| 10,807,173 B2 * | 10/2020 | Kinoshita | B23C 5/2204 |
| 11,890,688 B1 * | 2/2024 | Shapir | B23C 5/08 |
| 2001/0051075 A1 * | 12/2001 | Focken | B23C 5/24 407/34 |
| 2002/0110428 A1 * | 8/2002 | Noggle | B23C 5/24 407/44 |
| 2011/0123281 A1 * | 5/2011 | Kretzschmann | B23B 29/03417 407/67 |
| 2014/0147220 A1 * | 5/2014 | Cheronneau | B23C 5/2472 407/53 |
| 2015/0037107 A1 * | 2/2015 | Buob | B23C 5/24 407/44 |
| 2017/0368615 A1 * | 12/2017 | Yamamoto | B23C 5/2213 |
| 2018/0009045 A1 * | 1/2018 | Yamamoto | B23C 5/202 |
| 2018/0111206 A1 * | 4/2018 | Deguchi | B23C 5/06 |
| 2018/0178295 A1 * | 6/2018 | Yamamoto | B23C 5/2472 |
| 2018/0185933 A1 * | 7/2018 | Deguchi | B23C 5/2208 |
| 2019/0118272 A1 * | 4/2019 | Shibuya | B23C 3/34 |
| 2019/0118276 A1 * | 4/2019 | Dubs | B23D 77/025 |
| 2020/0122247 A1 * | 4/2020 | Zhang | B23C 5/2273 |
| 2023/0390830 A1 * | 12/2023 | Ogawa | B23B 27/1611 |
| 2024/0042534 A1 * | 2/2024 | Shapir | B23C 5/2234 |

FOREIGN PATENT DOCUMENTS

| | | | | |
|---|---|---|---|---|
| DE | 3140905 A | * | 5/1983 | B23C 5/207 |
| DE | 3236921 C | * | 11/1983 | B23C 5/2444 |
| DE | 19800440 A1 | * | 7/1999 | B23C 5/241 |
| DE | 10250018 A1 | * | 5/2004 | B23B 29/03421 |
| DE | 102004058962 A1 | | 6/2006 | |
| DE | 102006024880 A1 | * | 11/2007 | B23B 29/03417 |
| EP | 410129 A | * | 1/1991 | B23C 5/241 |
| EP | 835709 A1 | * | 4/1998 | B23B 29/03428 |
| EP | 3981531 A1 | | 4/2022 | |
| JP | 64-26116 U | | 2/1989 | |
| JP | 2009-125828 A | | 6/2009 | |
| JP | 2013-176827 A | | 9/2013 | |
| JP | 2020-508225 A | | 3/2020 | |
| JP | 2020-199572 A | | 12/2020 | |
| WO | WO-2007058244 A1 | * | 5/2007 | B23C 5/06 |
| WO | 2018/154557 A1 | | 8/2018 | |
| WO | 2020/217846 A1 | | 10/2020 | |

* cited by examiner

CUTTING TOOL

CROSS-REFERENCE TO RELATED APPLICATION

The present application is based on PCT filing PCT/JP2022/002921, filed Jan. 26, 2022, the entire contents of which are incorporated herein by reference.

TECHNICAL FIELD

The present disclosure relates to a cutting tool.

BACKGROUND ART

Japanese Patent Laying-Open No. 2013-176827 (PTL 1) describes a cutting tool. The cutting tool described in PTL 1 includes a tool main body, a cartridge, a cutting insert, and a vibration adjustment mechanism. The cutting insert is attached to the cartridge. The cartridge is attached to the tool main body. The vibration adjustment mechanism adjusts an amount of protrusion of a cutting edge of the cutting insert in a radial direction.

CITATION LIST

Patent Literature

PTL 1: Japanese Patent Laying-Open No. 2013-176827

SUMMARY OF INVENTION

A cutting tool of the present disclosure is rotatable about a central axis and has a front end in an axial direction along the central axis. The cutting tool includes a body, a blade, a first attachment screw, an adjustment piece, and a second attachment screw. The body has an outer peripheral surface. A pocket is formed in the outer peripheral surface at an end portion on the front end side. The blade is attached to the body by screwing the first attachment screw into the body in the pocket. The blade has a blade side surface facing inward in a radial direction that is orthogonal to the axial direction and that passes through the central axis. An inner wall surface of the pocket has a contact surface facing the blade side surface with a space being interposed between the blade side surface and the contact surface in the radial direction. The space between the blade side surface and the contact surface is smaller in a direction away from the front end in the axial direction. The adjustment piece is disposed between the blade side surface and the contact surface. The second attachment screw is screwed into the body and is advanced or retracted along the axial direction so as to move the adjustment piece along the axial direction.

DETAILED DESCRIPTION

Figure 1:
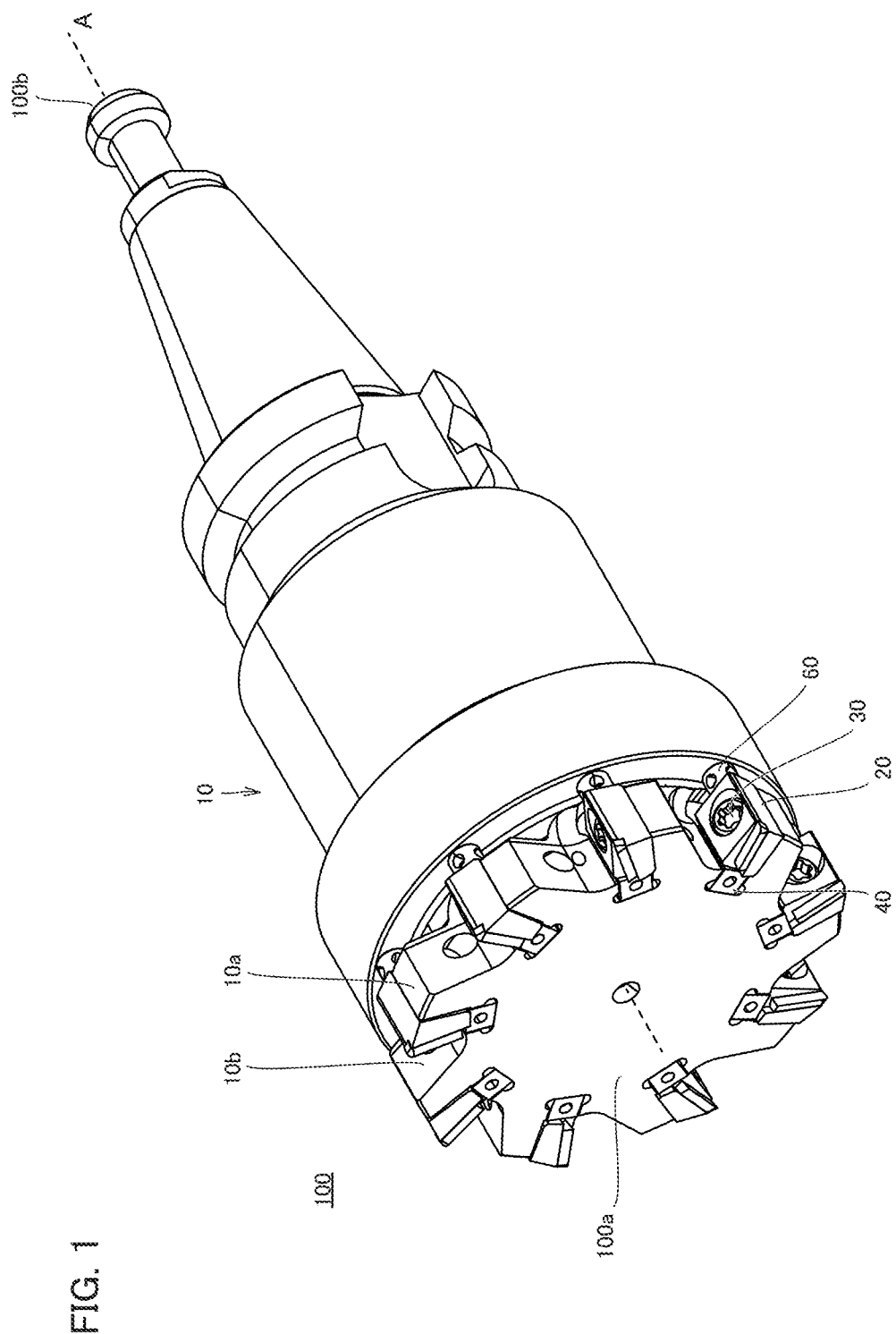
FIG. 1 is a perspective view of a cutting tool 100.

Problem to be Solved by the Present Disclosure

In the cutting tool described in PTL 1, there is room for improvement in terms of precision in position adjustment of the cutting edge. The present disclosure has been made in view of such a problem of the conventional art. More specifically, the present disclosure provides a cutting tool to improve precision in position adjustment of a cutting edge.

Advantageous Effect of the Present Disclosure

According to the cutting tool of the present disclosure, the precision in the position adjustment of the cutting edge can be improved.

SUMMARY OF EMBODIMENTS

First, embodiments of the present disclosure are listed and described.

(1) A cutting tool according to an embodiment is rotatable about a central axis and has a front end in an axial direction along the central axis. The cutting tool includes a body, a blade, a first attachment screw, an adjustment piece, and a second attachment screw. The body has an outer peripheral surface. A pocket is formed in the outer peripheral surface at an end portion on the front end side. The blade is attached to the body by screwing a first attachment screw into the body in the pocket. The blade has a blade side surface facing inward in a radial direction that is orthogonal to the axial direction and that passes through the central axis. An inner wall surface of the pocket has a contact surface facing the blade side surface with a space being interposed between the blade side surface and the contact surface in the radial direction. The space between the blade side surface and the contact surface is smaller in a direction away from the front end in the axial direction The adjustment piece is disposed between the blade side surface and the contact surface. The second attachment screw is screwed into the body and is advanced or retracted along the axial direction so as to move the adjustment piece along the axial direction. According to the cutting tool of (1), precision in position adjustment of the cutting edge can be improved.

(2) In the cutting tool of (1), the adjustment piece may have a first piece side surface that is in contact with the blade side surface, and a second piece side surface that is opposite to the first piece side surface in the radial direction and that is in contact with the contact surface. The second piece side surface may be parallel to the contact surface. According to the cutting tool of (2), the precision in position adjustment of the cutting edge can be further improved.

(3) In the cutting tool of (1) or (2), the second attachment screw may have a head portion and a stem portion connected to the head portion and screwed into the body. The head portion may be in contact with the adjustment piece such that a distance in the radial direction between a center of the stem portion in the radial direction and a center of the adjustment piece in the radial direction is 1.5 mm or less. According to the cutting tool of (3), axial force of the second attachment screw can be facilitated to be transmitted to the adjustment piece, thereby stabilizing movement of the adjustment piece.

(4) In the cutting tool of (1), the adjustment piece may have a first piece side surface that is in contact with the blade side surface, and a second piece side surface that is opposite to the first piece side surface in the radial direction and that is in contact with the contact surface. The second piece side surface may be parallel to the contact surface. The second attachment screw may have a head portion and a stem portion connected to the head portion and screwed into the body. The head portion may be in contact with the adjustment piece such that a distance in the radial direction between a center of the stem portion in the radial direction and a center of the adjustment piece in the radial direction is 1.5 mm or less.

Details of Embodiments

Next, details of the embodiments of the present disclosure will be described with reference to figures. In the below-described figures, the same or corresponding portions are denoted by the same reference characters, and the same explanation will not be described repeatedly. A cutting tool according to an embodiment will be referred to as "cutting tool 100".

(Configuration of Cutting Tool 100)

A configuration of cutting tool 100 will be described below.

Figure 2:
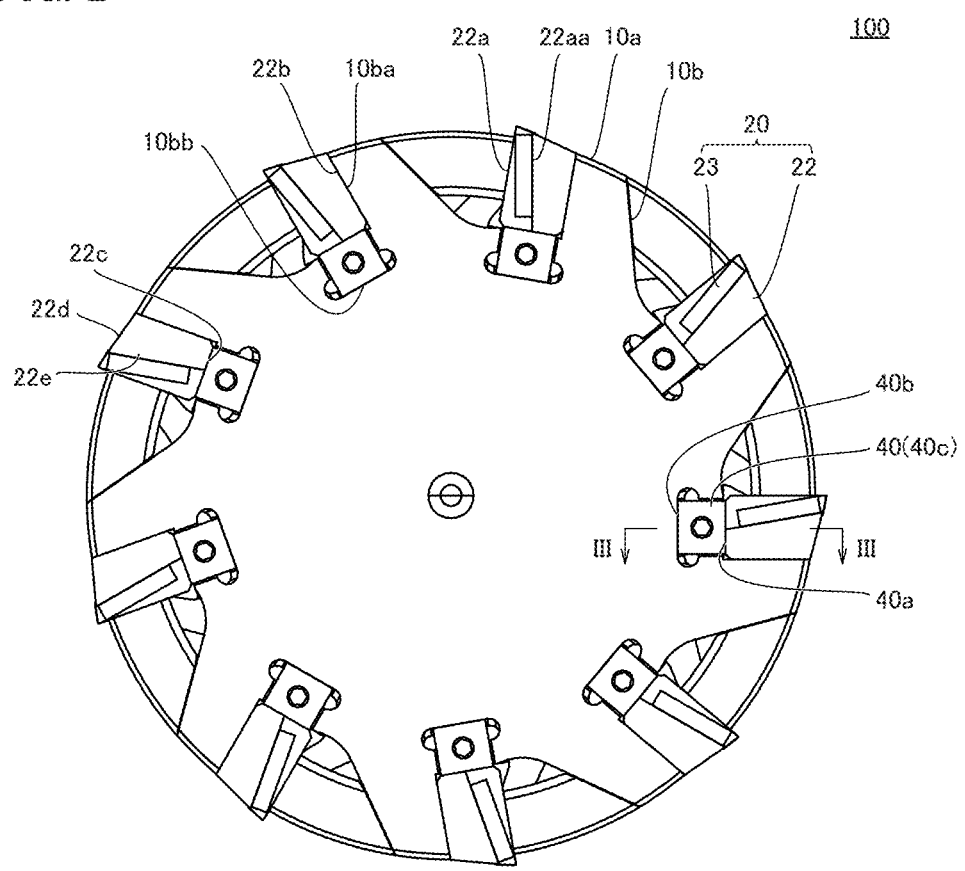
FIG. 2 is a front view of cutting tool 100.
Figure 3:
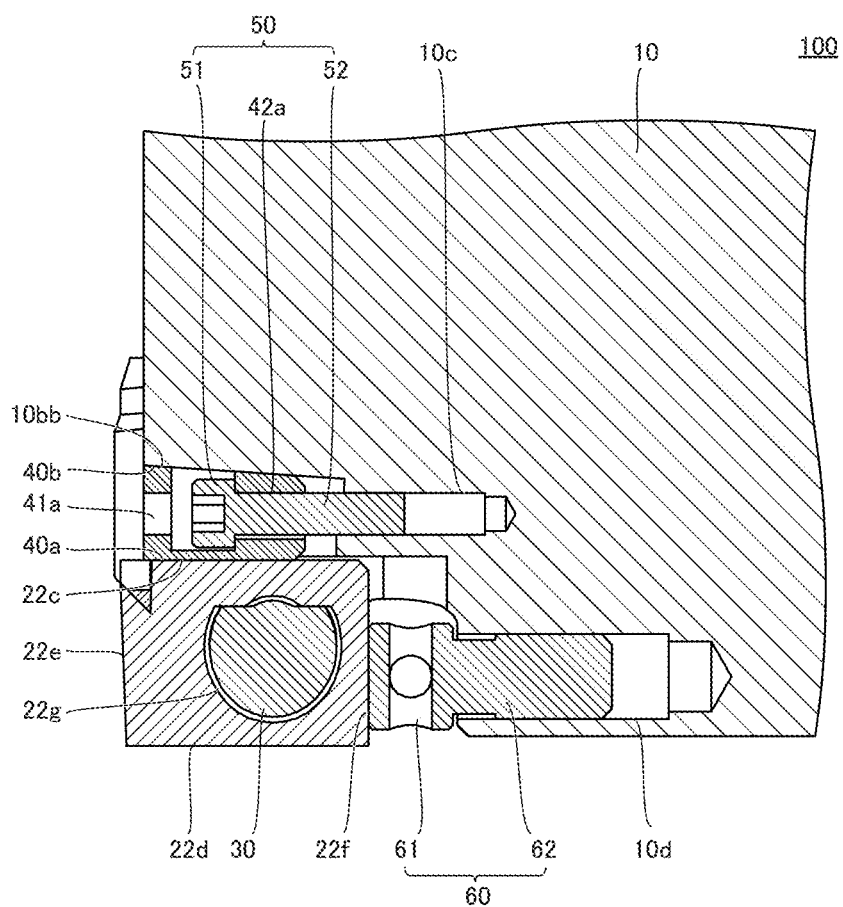
FIG. 3 is a cross sectional view at III-III in FIG. 2.
Figure 4:
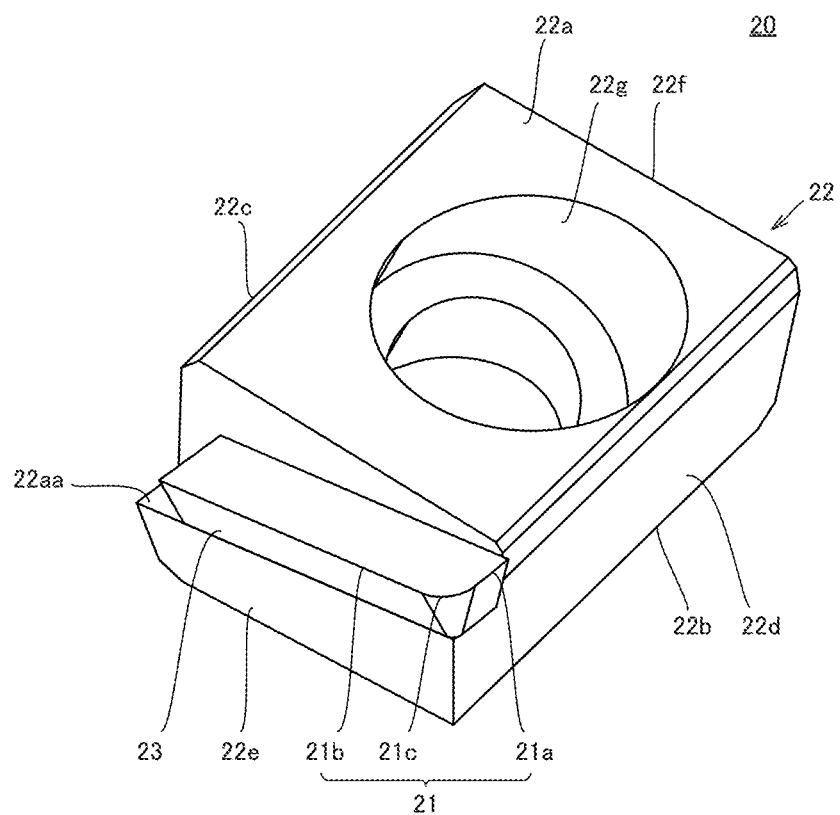
FIG. 4 is a perspective view of a blade 20.
Figure 5:
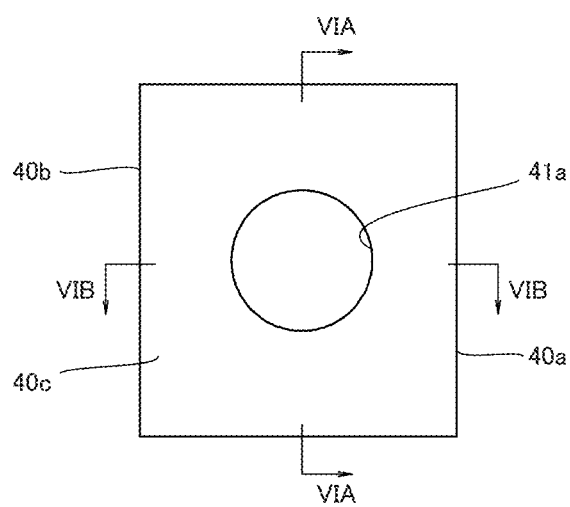
FIG. 5 is a front view of an adjustment piece 40.
Figure 6A:
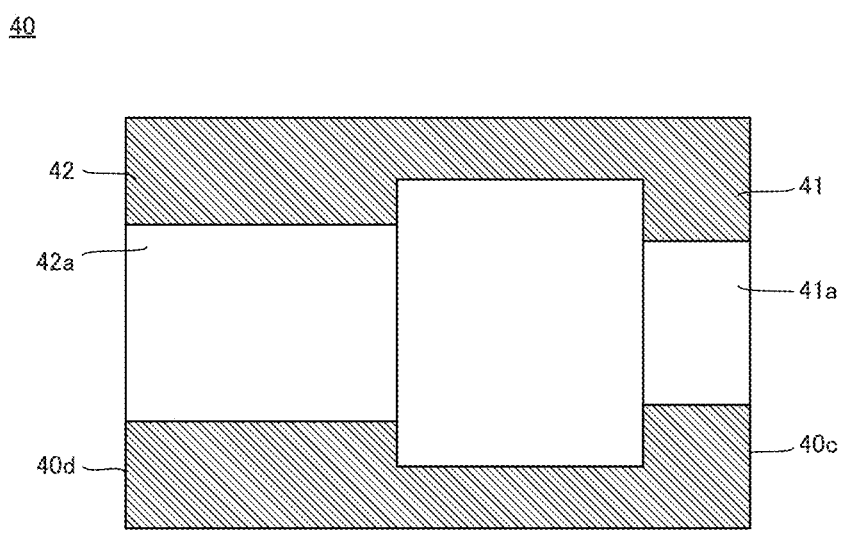
FIG. 6A is a cross sectional view at VIA-VIA in FIG. 5.
Figure 6B:
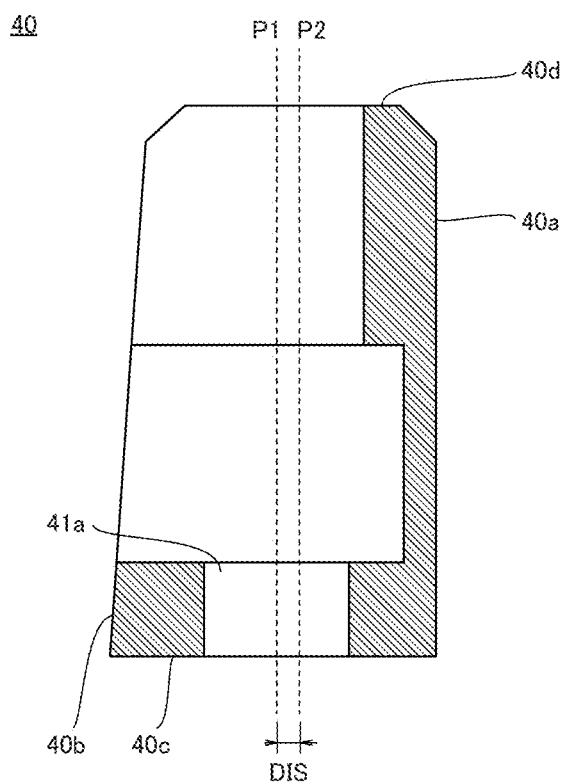
FIG. 6B is a cross sectional view at VIB-VIB in FIG. 5.
Figure 6C:
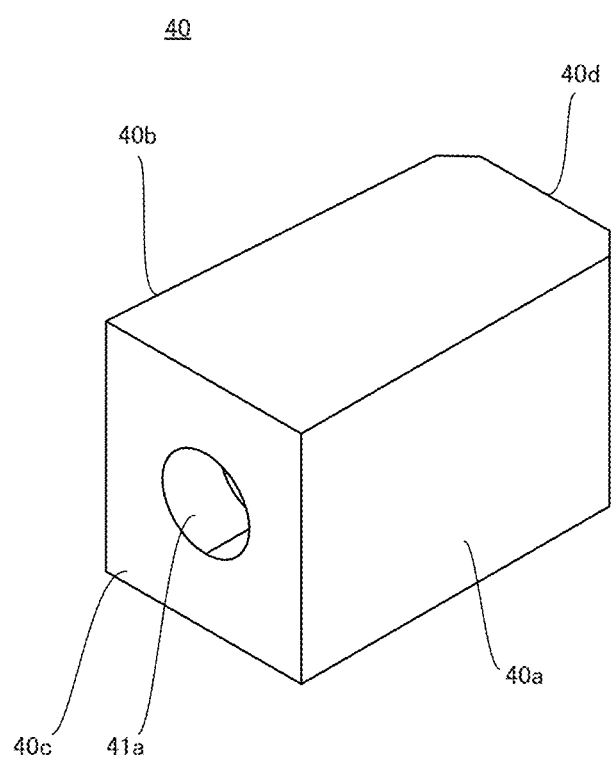
FIG. 6C is a first perspective view of adjustment piece 40.
Figure 6D:
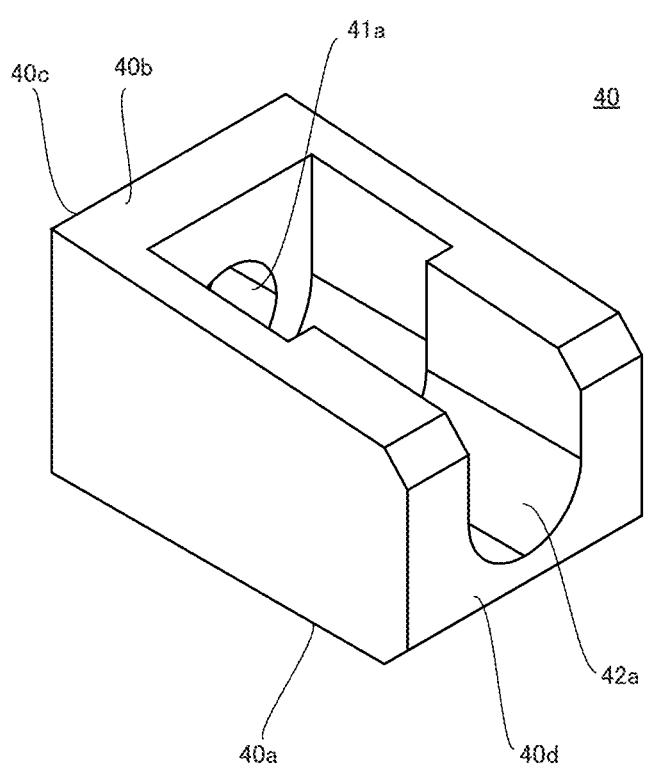
FIG. 6D is a second perspective view of adjustment piece 40.

FIG. 1 is a perspective view of cutting tool 100. FIG. 2 is a front view of cutting tool 100. FIG. 3 is a cross sectional view at III-III in FIG. 2. FIG. 4 is a perspective view of a blade 20. FIG. 5 is a front view of an adjustment piece 40. FIG. 6A is a cross sectional view at VIA-VIA in FIG. 5. FIG. 6B is a cross sectional view at VIB-VIB in FIG. 5. FIG. 6C is a first perspective view of adjustment piece 40. FIG. 6D is a second perspective view of adjustment piece 40. FIG. 6D is a perspective view of adjustment piece 40 when viewed in a direction different from that in FIG. 6C. As shown in FIGS. 1 to 6D, cutting tool 100 is a boring quill. However, cutting tool 100 is not limited thereto.

The central axis of cutting tool 100 is defined as a central axis A. A direction along central axis A is defined as an axial direction. A direction orthogonal to the axial direction and passing through central axis A is defined as a radial direction. When viewed along the axial direction, a direction along a circumference centered on central axis A is defined as a peripheral direction.

Cutting tool 100 has a front end 100a and a base end 100b. Front end 100a and base end 100b are respective ends of cutting tool 100 in the axial direction. Base end 100b is an end opposite to front end 100a. Cutting tool 100 is attached to a main shaft of a machine tool on the base end 100b side. The machine tool rotates cutting tool 100 about central axis A. Cutting tool 100 has a body 10, blade 20, a first attachment screw 30, adjustment piece 40, a second attachment screw 50, and an adjustment screw 60.

<Body 10>

Body 10 is composed of, for example, steel. Body 10 has an outer peripheral surface 10a. A plurality of pockets 10b are formed in outer peripheral surface 10a at an end portion of body 10 on the front end 100a side. The plurality of pockets 10b are formed, for example, at equal intervals in the peripheral direction. Each of pockets 10b has a seating surface 10ba and a contact surface 10bb. Seating surface 10ba is a portion of an inner wall surface of pocket 10b in contact with a bottom surface 22b described later. Contact surface 10bb is a portion of pocket 10b facing a below-described first blade side surface 22c with a space being interposed therebetween in the radial direction in a state in which blade 20 is attached to body 10. Although not shown, a screw hole is formed in seating surface 10ba.

<Blade 20>

Blade 20 has a cutting edge 21. When cutting edge 21 is brought into contact with a workpiece with cutting tool 100 being rotated about central axis A, a cutting process on the workpiece is performed.

Cutting edge 21 has a first cutting edge 21a, a second cutting edge 21b, and a corner cutting edge 21c. First cutting edge 21a and second cutting edge 21b are connected to each other by corner cutting edge 21c. First cutting edge 21a extends along the axial direction when attached to body 10. Second cutting edge 21b extends along the radial direction when attached to body 10. Blade 20 has a base body 22 and a cutting edge tip 23. It should be noted that blade 20 may be constituted only of base body 22.

Base body 22 is composed of, for example, a cemented carbide. Base body 22 has an upper surface 22a, a bottom surface 22b, a first blade side surface 22c, a second blade side surface 22d, a third blade side surface 22e, and a fourth blade side surface 22f. Upper surface 22a and bottom surface 22b are end surfaces in the thickness direction of base body 22. Bottom surface 22b is a surface opposite to upper surface 22a.

Each of first blade side surface 22c, second blade side surface 22d, third blade side surface 22e, and fourth blade side surface 22f is contiguous to upper surface 22a at the upper end, and is contiguous to bottom surface 22b at the lower end. First blade side surface 22c faces inward in the radial direction when attached to body 10. Second blade side surface 22d is a surface opposite to first blade side surface 22c. Third blade side surface 22e faces the front end 100a side when attached to body 10. Fourth blade side surface 22f is a surface opposite to third blade side surface 22e.

Upper surface 22a has an attachment surface 22aa. Attachment surface 22aa is located at an end portion of upper surface 22a on the third blade side surface 22e side. A distance between attachment surface 22aa and bottom surface 22b is smaller than a distance between a portion of upper surface 22a other than attachment surface 22aa and bottom surface 22b. As a result, a step is formed between attachment surface 22aa and the portion of upper surface 22a other than attachment surface 22aa.

A through hole 22g is formed in base body 22. Through hole 22g extends through base body 22 along the thickness direction. From another viewpoint, it can be said that through hole 22g is opened at upper surface 22a and bottom surface 22b. As described above, first blade side surface 22c faces contact surface 10bb with a space being interposed therebetween in the radial direction. The space between first blade side surface 22c and contact surface 10bb is smaller in a direction away from front end 100a.

Cutting edge tip 23 is composed of, for example, a sintered material of cubic boron nitride grains. Cutting edge tip 23 may be composed of a sintered material of diamond grains. However, the constituent material of cutting edge tip 23 is not limited thereto. Cutting edge tip 23 is attached to base body 22. More specifically, cutting edge tip 23 is attached to attachment surface 22aa by brazing, for example. Cutting edge 21 is formed in cutting edge tip 23. It should be noted that when blade 20 does not have cutting edge tip 23, cutting edge 21 is formed in base body 22.

<First Attachment Screw 30>

First attachment screw 30 is used to attach blade 20 to body 10. More specifically, blade 20 is attached to body 10 in pocket 10b by inserting first attachment screw 30 into through hole 22g and screwing first attachment screw 30 into a screw hole formed in seating surface 10ba with bottom surface 22b being in contact with seating surface 10ba.

<Adjustment Piece 40>

Adjustment piece 40 is used to adjust the position of blade 20 (cutting edge 21) in the radial direction. Adjustment piece 40 is disposed between first blade side surface 22c and contact surface 10bb, and is in contact with first blade side surface 22c and contact surface 10bb.

Adjustment piece 40 has a first piece side surface 40a and a second piece side surface 40b. First piece side surface 40a and second piece side surface 40b are end surfaces of adjustment piece 40 in the radial direction. First piece side surface 40a is in contact with first blade side surface 22c. Second piece side surface 40b is a surface opposite to first piece side surface 40a and is in contact with contact surface 10bb. Second piece side surface 40b is preferably parallel to contact surface 10bb. As described above, since the space between first blade side surface 22c and contact surface 10bb is smaller in the direction away from front end 100a, when adjustment piece 40 is moved away from front end 100a along the axial direction, blade 20 is moved outward in the radial direction, with the result that the position of first cutting edge 21a in the radial direction is moved outward.

Adjustment piece 40 has a third piece side surface 40c and a fourth piece side surface 40d. Third piece side surface 40c and fourth piece side surface 40d are end surfaces of adjustment piece 40 in the axial direction. Third piece side surface 40c faces the front end 100a side. Fourth piece side surface 40d is a surface opposite to third piece side surface 40c. Adjustment piece 40 has a first piece side wall 41 and a second piece side wall 42. First piece side wall 41 and second piece side wall 42 are side walls of adjustment piece 40 that respectively form third piece side surface 40c and fourth piece side surface 40d. First piece side wall 41 and second piece side wall 42 face each other with a space being interposed therebetween in the axial direction.

A first through hole 41a is formed in first piece side wall 41. First through hole 41a extends through first piece side wall 41 along the thickness direction (axial direction). One end of first through hole 41a is opened in third piece side surface 40c, and the other end of first through hole 41a is opened in the inside of adjustment piece 40. A second through hole 42a is formed in second piece side wall 42. Second through hole 42a extends through second piece side wall 42 along the thickness direction (axial direction). One end of second through hole 42a is opened in fourth piece side surface 40d, and the other end of second through hole 42a is opened in the inside of adjustment piece 40.

The center of adjustment piece 40 in the radial direction is defined as a first position P1. First position P1 is a midpoint between the end of first piece side surface 40a on the third piece side surface 40c side and the end of second piece side surface 40b on the third piece side surface 40c side. The center of a stem portion 52 (described later) in the radial direction is defined as a second position P2. A distance between first position P1 and second position P2 in the radial direction is defined as a distance DIS. Second position P2 may be close to first piece side surface 40a with respect to first position P1, or may be close to second piece side surface 40b with respect to first position P1.

<Second Attachment Screw 50>

Second attachment screw 50 is used to advance or retract adjustment piece 40 along the axial direction. Second attachment screw 50 has a head portion 51 and stem portion 52. Head portion 51 is disposed inside adjustment piece 40. Head portion 51 is preferably in contact with the inner wall surface of second piece side wall 42 such that distance DIS is 1.5 mm or less. Distance DIS is more preferably 0 mm (first position P1 coincides with second position P2).

Stem portion 52 is connected to head portion 51. Stem portion 52 extends along the axial direction. Stem portion 52 is inserted into second through hole 42a and is screwed into a screw hole 10c. It should be noted that screw hole 10c is formed in body 10 and extends along the axial direction. By inserting the tool from first through hole 41a and rotating head portion 51 about the central axis of second attachment screw 50, second attachment screw 50 is advanced or retracted along the axial direction. Since head portion 51 is in contact with the inner wall surface of second piece side wall 42 as described above, adjustment piece 40 is also advanced or retracted along the axial direction in response to second attachment screw 50 being advanced or retracted along the axial direction.

<Adjustment Screw 60>

An adjustment screw 60 is used to adjust a position of blade 20 (cutting edge 21) in the axial direction. Adjustment screw 60 has a head portion 61 and a stem portion 62. Head portion 61 is in contact with fourth blade side surface 22f. Stem portion 62 is connected to head portion 61. Stem portion 62 extends along the axial direction. Stem portion 62 is screwed into a screw hole 10d. It should be noted that screw hole 10d is formed in body 10 and extends along the axial direction. Since head portion 61 is in contact with fourth blade side surface 22f, the position of blade 20 in the axial direction is adjusted by rotating head portion 61 about the central axis of adjustment screw 60 so as to advance or retract adjustment screw 60 along the axial direction.

(Method of Adjusting Position of Blade 20 in Cutting Tool 100)

A method of adjusting the position of blade 20 in cutting tool 100 will be described below.

First, when adjusting the position of blade 20 in cutting tool 100, blade 20 is temporarily fastened to body 10 using first attachment screw 30. A state in which blade 20 is temporarily fastened to body 10 by first attachment screw 30 is a state in which fastening torque of first attachment screw 30 is about 30% of recommended fastening torque. The recommended fastening torque is determined by the screw size of first attachment screw 30.

Second, the position of blade 20 in the axial direction is adjusted by rotating adjustment screw 60. Third, the position of blade 20 in the radial direction is adjusted by rotating second attachment screw 50. Fourth, blade 20 is fully fastened to body 10 by further rotating first attachment screw 30. A state in which blade 20 is fully fastened to body 10 by first attachment screw 30 is a state in which fastening torque of first attachment screw 30 is more than or equal to the recommended fastening torque. In this way, in cutting tool 100, the positions of blade 20 in the radial direction and the axial direction are adjusted.

(Effects of Cutting Tool 100)

Effects of cutting tool 100 will be described below in comparison with a cutting tool according to a comparative example. The cutting tool according to the comparative example will be referred to as "cutting tool 200".

Figure 7:
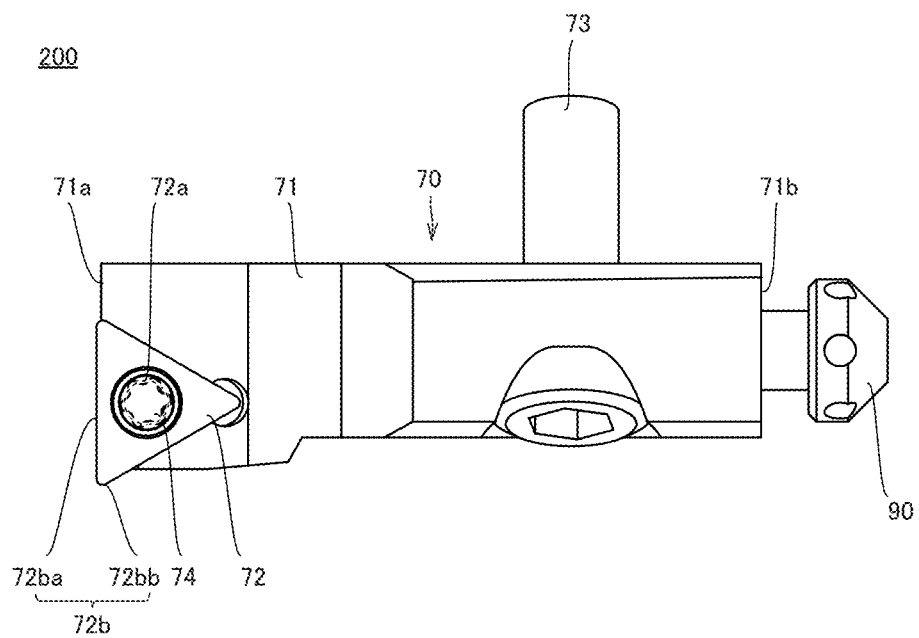
FIG. 7 is a partial plan view of a cutting tool 200.
Figure 8:
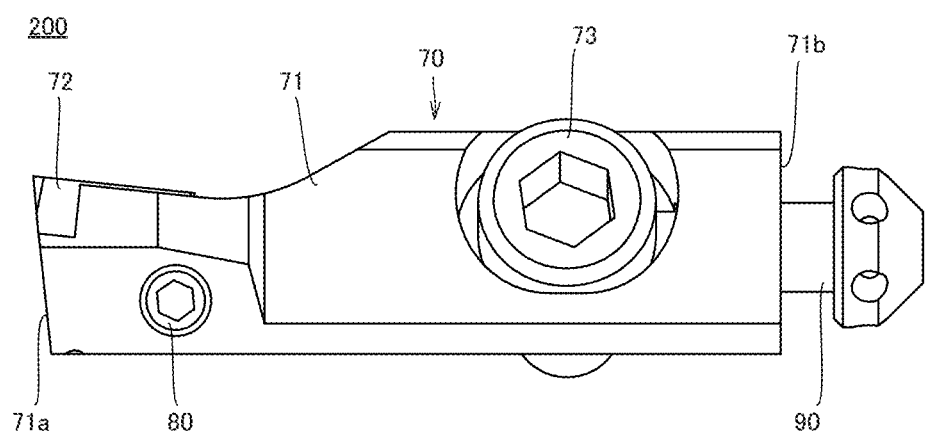
FIG. 8 is a first partial side view of cutting tool 200.
Figure 9:
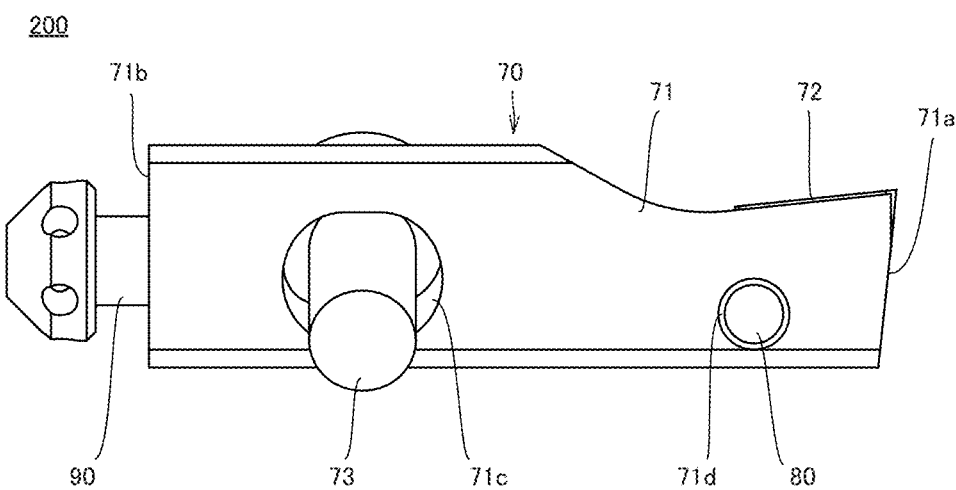
FIG. 9 is a second partial side view of cutting tool 200.

FIG. 7 is a partial plan view of cutting tool 200. FIG. 8 is a first partial side view of cutting tool 200. FIG. 9 is a second partial side view of cutting tool 200. In FIGS. 7 to 9, body 10 is not illustrated. As shown in FIGS. 7 to 9, in cutting tool 200, a cartridge 70, a radial-direction adjustment screw 80, and an axial-direction adjustment screw 90 are used instead of blade 20, first attachment screw 30, adjustment piece 40, second attachment screw 50, and adjustment screw 60. Cartridge 70 has a cartridge main body 71, a cutting insert 72, an attachment screw 73, and an attachment screw 74.

Cartridge main body 71 (cartridge 70) extends along the axial direction. Respective ends of cartridge main body 71 in the axial direction are defined as a first end 71a and a second end 71b. First end 71a is an end of cutting tool 200 on the front end side. Second end 71b is an end opposite to first end 71a.

A through hole 71c and a screw hole 71d are formed in cartridge main body 71. Through hole 71c is located close to second end 71b with respect to the center of cartridge main body 71 in the axial direction. Screw hole 71d is located close to first end 71a with respect to the center of cartridge main body 71 in the axial direction. Cartridge main body 71 is attached to body 10 by inserting attachment screw 73 into through hole 71c and screwing attachment screw 73 into a screw hole (not shown) formed in body 10.

A through hole 72a is formed in cutting insert 72. Cutting insert 72 is attached to cartridge main body 71 by inserting attachment screw 74 into through hole 72a and screwing attachment screw 74 into a screw hole (not shown) formed in cartridge main body 71. Cutting insert 72 is attached to an end portion of cartridge main body 71 on the first end 71a side.

Cutting insert 72 has a cutting edge 72b. Cutting edge 72b has a plurality of straight cutting edges 72ba and a plurality of corner cutting edges 72bb. Cartridge 70 is attached to body 10 such that the extending direction of one of the plurality of straight cutting edges 72ba is along the radial direction in a state in which cartridge main body 71 is attached to body 10.

Radial-direction adjustment screw 80 is screwed into screw hole 71d. When radial-direction adjustment screw 80 is rotated about the central axis, the front end of the stem portion thereof protrudes from cartridge main body 71 and comes into contact with body 10. Thus, the position of the cutting edge of cutting insert 72 in the radial direction is adjusted. The stem portion of axial-direction adjustment screw 90 is screwed into a screw hole (not shown) formed in an end surface of cartridge main body 71 on the second end 71b side. The head portion of axial-direction adjustment screw 90 is in contact with body 10. Therefore, by rotating axial-direction adjustment screw 90 about the central axis, the position of the cutting edge of cutting insert 72 in the axial direction is adjusted.

First, when adjusting the position of cutting insert 72 in cutting tool 200, cartridge main body 71 is temporarily fastened to body 10 using attachment screw 73. A state in which cartridge main body 71 is temporarily fastened to body 10 by attachment screw 73 is a state in which fastening torque of attachment screw 73 is about 30% of recommended fastening torque. The recommended fastening torque is determined by the screw size of attachment screw 73. Second, the position of cutting insert 72 in the axial direction is adjusted by advancing or retracting axial-direction adjustment screw 90 along the axial direction. Third, the position of cutting insert 72 in the radial direction is adjusted by rotating radial-direction adjustment screw 80 to change an amount of protrusion from cartridge main body 71.

Fourth, cartridge main body 71 is fully fastened to body 10 by further rotating attachment screw 73. A state in which cartridge main body 71 is fully fastened to body 10 by attachment screw 73 is a state in which fastening torque of attachment screw 73 is more than or equal to the recommended fastening torque. In this way, in cutting tool 200, the positions of cutting insert 72 (cutting edge 72b) in the radial direction and the axial direction are adjusted.

In cutting tool 200, the position of cutting insert 72 in the radial direction is adjusted by protruding the front end of the stem portion of radial-direction adjustment screw 80 with respect to cartridge main body 71 and bringing the front end into contact with body 10. Further, the position of radial-direction adjustment screw 80 in the axial direction is greatly separated from the position of attachment screw 73 in the axial direction.

Therefore, when the position of cutting insert 72 in the radial direction is adjusted, cartridge main body 71 is deflected with the vicinity of attachment screw 73 serving as a fulcrum. Due to this deflection, the extending direction of cutting edge 72b is inclined with respect to the radial direction. Deflection of cartridge main body 71 occurs also when attachment screw 73 is fully fastened. Accordingly, even though the position of cutting insert 72 in the radial direction is adjusted, the position of cutting insert 72 in the radial direction is displaced when fully fastening attachment screw 73. Thus, in cutting tool 200, precision in position adjustment of cutting insert 72 (cutting edge 72b) becomes low.

On the other hand, in cutting tool 100, the position of blade 20 in the radial direction is adjusted by advancing or retracting adjustment piece 40, which is located between contact surface 10bb and first blade side surface 22c, along the axial direction. The position of adjustment piece 40 in the axial direction is close to the position of first attachment screw 30 in the axial direction.

As a result, in cutting tool 100, blade 20 is less likely to be deflected with first attachment screw 30 serving as a fulcrum, with the result that second cutting edge 21b is less likely to be inclined with respect to the radial direction when adjusting the position of blade 20 in the radial direction and the position of blade 20 in the radial direction is less likely to be displaced when fully fastening first attachment screw 30. Thus, according to cutting tool 100, precision in position adjustment of blade 20 (cutting edge 21) can be improved.

When contact surface 10bb and second piece side surface 40b are parallel to each other, force is likely to be applied from adjustment piece 40 to blade 20 in a direction close to a direction parallel to the radial direction. Therefore, in this case, second cutting edge 21b is further less likely to be inclined with respect to the radial direction when adjusting the position of blade 20 in the radial direction, and displacement of the position in the radial direction is further less likely to occur when fully fastening first attachment screw 30.

When head portion 51 is in contact with adjustment piece 40 such that distance DIS is 1.5 mm or less, axial force of second attachment screw 50 is facilitated to be transmitted to adjustment piece 40, thereby stabilizing movement of adjustment piece 40.

(Evaluation on Precision in Position Adjustment of Cutting Edge)

A first test and a second test were performed in order to evaluate precision in position adjustment of cutting edge 21 in cutting tool 100 and precision in position adjustment of cutting edge 72b in cutting tool 200.

<First Test>

In the first test, evaluations were made on a variation amount (angle variation amount X1) of an inclination angle of second cutting edge 21b with respect to the radial direction before and after moving the position of blade 20 outward in the radial direction and a variation amount (angle variation amount X2) of an inclination angle of straight cutting edge 72ba with respect to the radial direction before and after moving the position of cutting insert 72 outward in the radial direction. Each of the inclination angle of second cutting edge 21b with respect to the radial direction before moving the position of blade 20 outward in the radial direction and the inclination angle of straight cutting edge 72ba with respect to the radial direction before moving the position of cutting insert 72 outward in the radial direction was 0°.

Figure 10A:
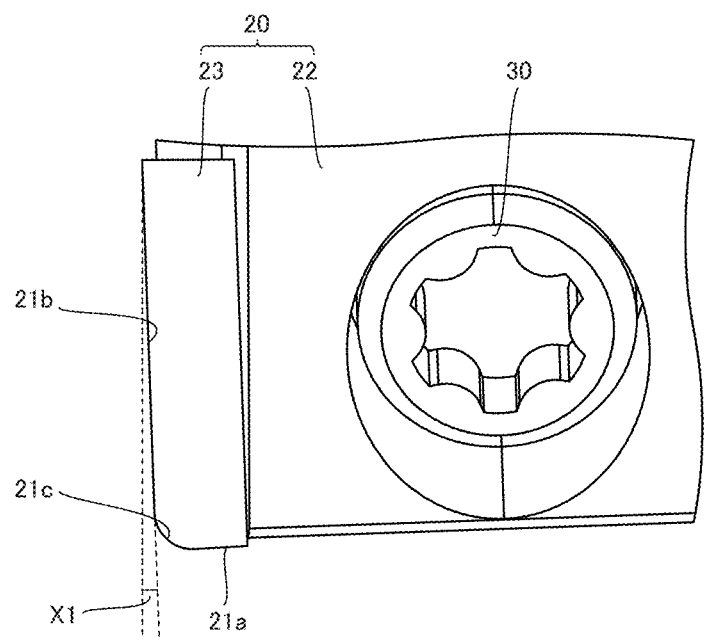
FIG. 10A is a schematic diagram illustrating a method of measuring an angle variation amount X1.

FIG. 10A is a schematic diagram illustrating a method of measuring angle variation amount X1. As shown in FIG. 10A, in the measurement of angle variation amount X1, first, the position of blade 20 is moved outward by 0.05 mm in the radial direction by using second attachment screw 50. Second, the shape of cutting edge 21 is measured using venturion 450 (hereinafter, referred to as "cutting edge measurement instrument") provided by Zoller. On this occasion, a measurement program used in the cutting edge measurement instrument is Lasso function/No. 21, a measurement mode of the cutting edge measurement instrument is measurement NN, and measurement precision of the cutting edge measurement instrument is 0.001 mm. Third, an angle between second cutting edge 21b and the radial direction is calculated based on the shape of cutting edge 21 obtained as described above. This angle represents angle variation amount X1.

Figure 10B:
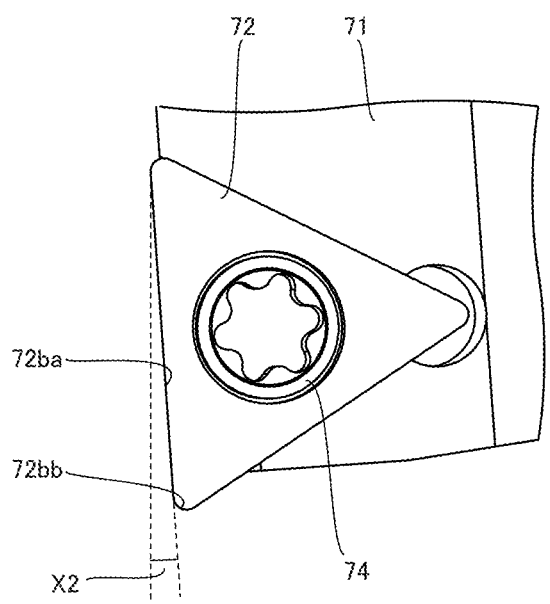
FIG. 10B is a schematic diagram illustrating a method of measuring an angle variation amount X2.

FIG. 10B is a schematic diagram illustrating a method of measuring angle variation amount X2. As shown in FIG. 10B, in the measurement of angle variation amount X2, first, the position of cutting insert 72 is moved outward by 0.05 mm in the radial direction by using radial-direction adjustment screw 80. Second, the shape of cutting edge 72b is measured using a cutting edge measurement instrument. Measurement conditions on this occasion are the same as those described above. Third, an angle between straight cutting edge 72ba and the radial direction is calculated based on the shape of cutting edge 72b obtained as described above. This angle represents angle variation amount X2.

In cutting tool 200, angle variation amount X2 was 0.19°. On the other hand, in cutting tool 100, angle variation amount X1 was 0.03°. That is, in cutting tool 100, the variation amount of the cutting edge angle before and after moving it outward in the radial direction was reduced by 84% as compared with cutting tool 200.

<Second Test>

In the second test, evaluations were made on a position variation amount (position variation amount Y1) of blade 20 in the radial direction before and after fully fastening first attachment screw 30 and a position variation amount (position variation amount Y2) of cutting insert 72 in the radial direction before and after fully fastening attachment screw 73.

Figure 11A:
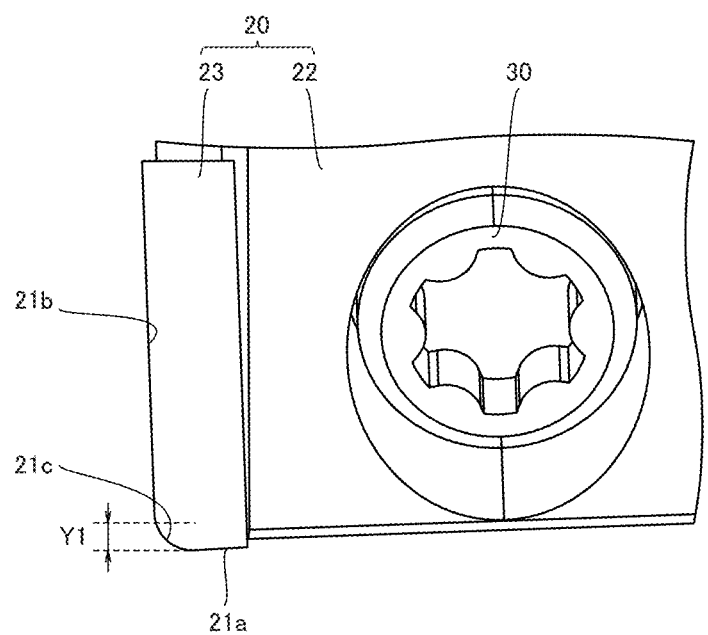
FIG. 11A is a schematic diagram illustrating a method of measuring a position variation amount Y1 before and after fully fastening a first attachment screw 30.

FIG. 11A is a schematic diagram illustrating a method of measuring position variation amount Y1 before and after fully fastening first attachment screw 30. As shown in FIG. 11A, in the measurement of the position variation of blade 20 in the radial direction before and after fully fastening first attachment screw 30, first, the shape of cutting edge 21 before fully fastening first attachment screw 30 (i.e., in a state in which first attachment screw 30 is temporarily fastened) is measured. Second, first attachment screw 30 is fully fastened. Third, the shape of cutting edge 21 after fully fastening first attachment screw 30 is measured.

Fourth, position variation amount Y1 is obtained by comparing an outermost position on cutting edge 21 in the radial direction before fully fastening first attachment screw 30 with an outermost position on cutting edge 21 in the radial direction after fully fastening first attachment screw 30. It should be noted that a method of measuring the shape of cutting edge 21 is the same as that in the first test.

Figure 11B:
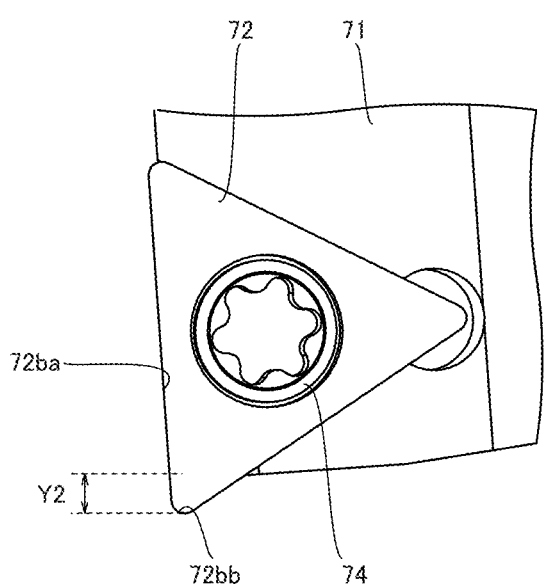
FIG. 11B is a schematic diagram illustrating a method of measuring a position variation amount Y2 before and after fully fastening an attachment screw 73.

FIG. 11B is a schematic diagram illustrating a method of measuring position variation amount Y2 before and after fully fastening attachment screw 73. As shown in FIG. 11B, in the measurement of the position variation of cutting insert 72 in the radial direction before and after fully fastening attachment screw 73, first, the shape of cutting edge 72b before fully fastening attachment screw 73 (i.e., in a state in which attachment screw 73 is temporarily fastened) is measured. Second, attachment screw 73 is fully fastened. Third, the shape of cutting edge 72b after fully fastening attachment screw 73 is measured.

Fourth, position variation amount Y2 is obtained by comparing an outermost position on cutting edge 72b in the radial direction before fully fastening attachment screw 73 with an outermost position on cutting edge 72b in the radial direction after fully fastening attachment screw 73. It should be noted that a method of measuring the shape of cutting edge 72b is the same as that in the first test.

In cutting tool 200, position variation amount Y2 was 0.009 mm. On the other hand, in cutting tool 100, position variation amount Y1 was 0.001 mm. That is, in cutting tool 100, the position variation of the cutting edge in the radial direction before and after fully fastening the attachment screw was reduced by 89% as compared with cutting tool 200.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 100, 200: cutting tool; 100a: front end; 100b: base end; A: central axis; 10: body; 10a: outer peripheral surface; 10b: pocket; 10ba: seating surface; 10bb: contact surface; 10c: screw hole; 10d: screw hole; 20: blade; 21: cutting edge; 21a: first cutting edge; 21b: second cutting edge; 21c: corner cutting edge; 22: base body; 22a: upper surface; 22aa: attachment surface; 22b: bottom surface; 22c: first blade side surface; 22d: second blade side surface; 22e: third blade side surface; 22f: fourth blade side surface; 22g: through hole; 23: cutting edge tip; 30: first attachment screw; 40: adjustment piece; 40a: first piece side surface; 40b: second piece side surface; 40c: third piece side surface; 40d: fourth piece side surface; 41: first piece side wall; 41a: first through hole; 42: second piece side wall; 42a: second through hole; 50: second attachment screw; 51: head portion; 52: stem portion; 60: adjustment screw; 61: head portion; 62: stem portion; 70: cartridge; 71: cartridge main body; 71a: first end; 71b: second end; 71c: through hole; 71d: screw hole; 72: cutting insert; 72a: through hole; 72b: cutting edge; 72ba: straight cutting edge; 72bb: corner cutting edge; 73: attachment screw; 74:

attachment screw; 80: radial-direction adjustment screw; 90: axial-direction adjustment screw; DIS: distance; P1: first position; P2: second position; X1: angle variation amount; X2: angle variation amount; Y1: position variation amount; Y2: position variation amount.

The invention claimed is:

1. A cutting tool that is rotatable about a central axis and that has a front end in an axial direction along the central axis, the cutting tool comprising:
   a body;
   a blade;
   a first attachment screw;
   an adjustment piece;
   an adjustment screw; and
   a second attachment screw, wherein
   the body has an outer peripheral surface,
   a pocket is formed in the outer peripheral surface at an end portion on a front end side,
   the blade is attached to the body by screwing the first attachment screw into the body in the pocket,
   the blade has a blade side surface facing inward in a radial direction that is orthogonal to the axial direction and that passes through the central axis,
   an inner wall surface of the pocket has a contact surface facing the blade side surface with a space being interposed between the blade side surface and the contact surface in the radial direction,
   the space between the blade side surface and the contact surface is smaller in a direction away from the front end in the axial direction,
   the adjustment piece is disposed between the blade side surface and the contact surface,
   the second attachment screw is screwed into the body and is advanced or retracted along the axial direction so as to move the adjustment piece along the axial direction,
   the second attachment screw has a head portion and a stem portion connected to the head portion and screwed into the body,
   the adjustment piece has a third piece side surface that faces outward in the axial direction, a center of the adjustment piece being a midpoint between opposite edges of the third piece side surface in the radial direction,
   the adjustment screw extends in parallel with the second attachment screw and is configured to adjust a position of the blade in the axial direction, and
   the head portion is in contact with the adjustment piece such that a distance in the radial direction between a center of the stem portion in the radial direction and the center of the adjustment piece in the radial direction is 1.5 mm or less.

2. The cutting tool according to claim 1, wherein
   the adjustment piece has a first piece side surface that is in contact with the blade side surface, and a second piece side surface that is opposite to the first piece side surface in the radial direction and that is in contact with the contact surface, and
   the second piece side surface is parallel to the contact surface.

3. The cutting tool according to claim 1, wherein the first attachment screw extends lengthwise in a direction orthogonal to the radial direction.

* * * * *